United States Patent [19]

Grove

[11] 4,062,516

[45] Dec. 13, 1977

[54] VALVE CONSTRUCTION

[75] Inventor: Marvin H. Grove, Houston, Tex.

[73] Assignee: M & J Valve Company, Houston, Tex.

[21] Appl. No.: 668,588

[22] Filed: Mar. 19, 1976

Related U.S. Application Data

[62] Division of Ser. No. 585,228, June 9, 1975, Pat. No. 3,972,507.

[51] Int. Cl.² .............................................. F16K 5/06
[52] U.S. Cl. ................................... 251/174; 251/327; 251/328
[58] Field of Search ............... 251/327, 328, 329, 326, 251/174

[56] References Cited

U.S. PATENT DOCUMENTS

| 769,831 | 9/1904 | Ogden | 251/328 |
|---------|--------|-------|---------|
| 2,718,372 | 9/1955 | Broz | 251/174 |
| 3,807,688 | 4/1974 | Karr | 251/174 |

Primary Examiner—Harold W. Weakley
Attorney, Agent, or Firm—Flehr, Hohbach, Test, Albritton & Herbert

[57] ABSTRACT

A fluid control valve of the short gate type having means for maintaining a minimum spacing between the seat rings when the gate is moved to open position. The means makes use of two spreader members that can be readily installed as the valve is assembled.

1 Claim, 7 Drawing Figures

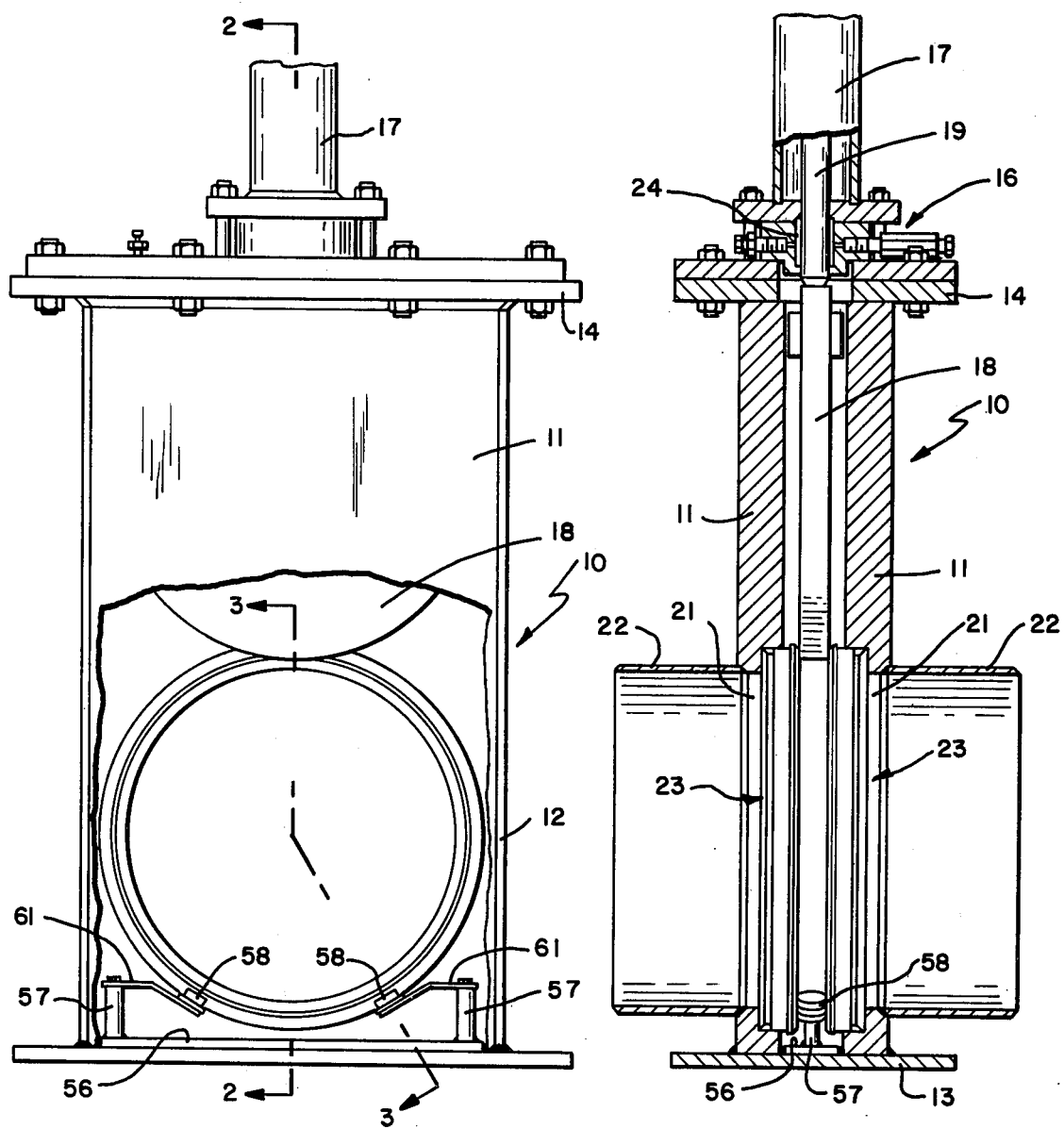
FIG.—1
FIG.—2
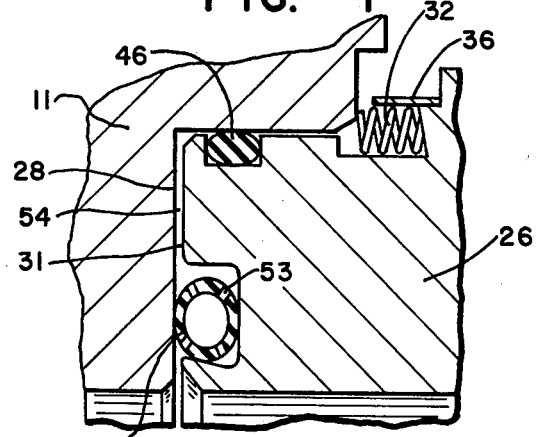
FIG.—4
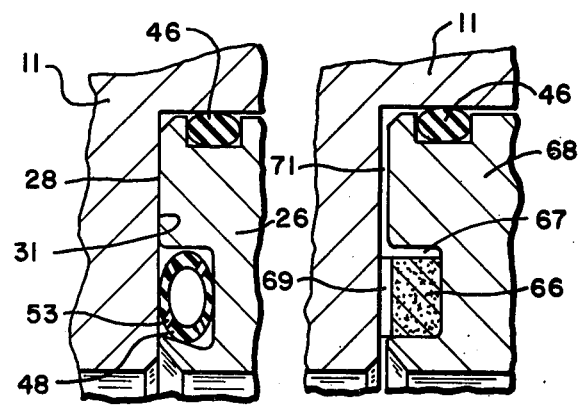
FIG.—5  FIG.—7

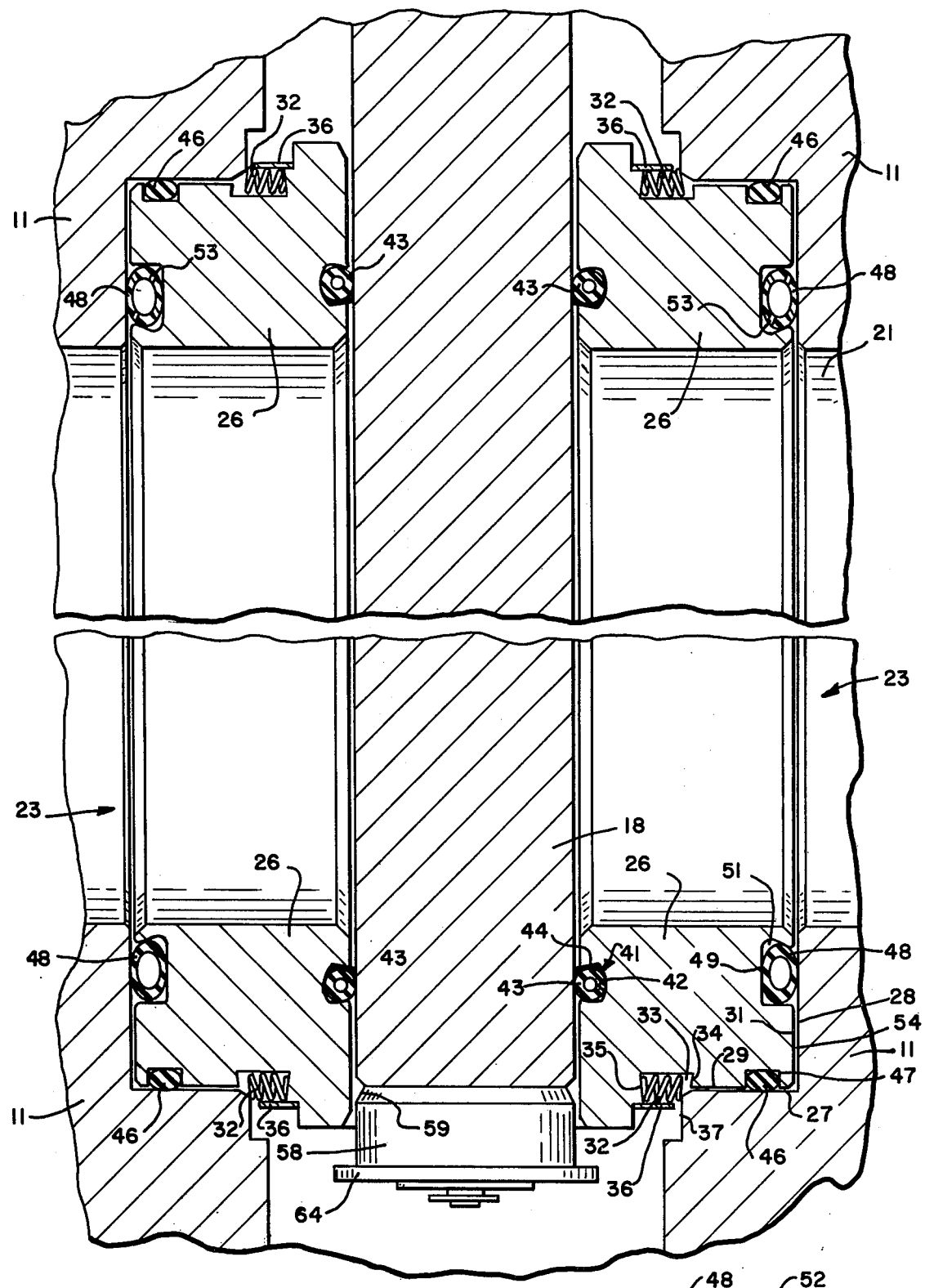
FIG.—3
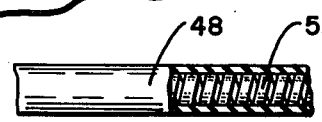
FIG.—6

VALVE CONSTRUCTION

CROSS REFERENCE TO RELATED APPLICATION

This application is a division of copending application Ser. No. 585,228, filed June 9, 1975 now U.S. Pat. No. 3,972,507, dated Aug. 3, 1976.

BACKGROUND OF THE INVENTION

This invention relates generally to the construction of valves used for controlling the flow of various fluids, including liquids and gas.

It is common practice in the construction of valves (gate or ball) to employ seat rings that are accommodated in recesses provided in the valve body and which are spring-urged toward the movable valve member. One difficulty that has been experienced with such valves, particularly when used in systems handling petroleum liquids, is that sediment tends to accumulate behind the seat rings, thereby limiting their range of movement. This may make opening and closing movements of the valve member difficult, particularly when the valve is of the short gate type. As shown in U.S. Pat. No. 3,807,688, granted Apr. 20, 1974, spreader means can be provided to maintain a minimum spacing between the seat rings when a short gate is moved to open position. This is of benefit in preventing accumulation of sediment to the extent of interfering with closing of the gate, but it does not prevent such accumulation of sediment as may materially restrict movements of the seat ring relative to the body. Also, while the spreader means shown in the above-mentioned patent is effective, it is somewhat difficult to install with proper alignment during assembly of the valve. Also under certain conditions it may permit some cocking of the seat rings when the gate is in open position.

SUMMARY OF THE INVENTION AND OBJECTS

In general it is an object of the invention to provide improved spreader means for valves of the short gate type, which can be readily installed without difficulty with respect to alignment and which prevents cocking of the seat rings.

In general, the invention consists of a valve body, preferably of the fabricated type, having aligned openings forming flow passages. A short type of valve gate is disposed within the body and is movable between open and closed positions relative to the flow passages. Operating means extends through the upper end of the valve body and has operative connection with the valve gate. Valve sealing means surrounds at least one of the flow passages and establishes seals between the body and the valve member for closed position. Each sealing means makes use of a seat ring made of metal which is slidably accommodated in a recess provided in the body and which is spring urged toward the gate. Spreader means is provided consisting of members carried by yieldable means and normally disposed between lower portions of the seat rings in the lower corners of the valve body to provide minimum spacing between the seat rings.

Additional objects and features of the invention will appear from the following description in which the preferred embodiments have been set forth in detail in conjunction with the accompanying drawing.

BRIEF DESCRIPTION OF THE DRAWING

FIG. 1 is an end view illustrating a valve incorporating the present invention;

FIG. 2 is a side elevational view in section taken along the line 2 — 2 of FIG. 1;

FIG. 3 is an enlarged detail in section taken along the line 3 — 3 of FIG. 1;

FIGS. 4 and 5 are details on an enlarged scale in section, illustrating the seat ring in two operating positions;

FIG. 6 is a detail showing another form of guard member; and

FIG. 7 is a detail on an enlarged scale in section, illustrating another sediment guard embodiment.

DESCRIPTION OF THE PREFERRED EMBODIMENTS

The short gate type valve illustrated in FIGS. 1 and 2 consists of a box-like body 10, preferably of fabricated construction, formed of end walls 11 which are welded at the corners of the body to the side walls 12. The lower end of the body is closed by the bottom plate 13. The upper end of the body is provided with a flange 14 which serves to mount the bonnet assembly 16, which in turn supports the yoke 17. The flat slab-type gate 18 within the body has its upper end connected to the operating stem or rod 19. The rod 19 connects to suitable operating means (not shown) such as one of the handwheel type, or a power operator of the pneumatic, hydraulic or electrical type. The bonnet is provided with suitable sealing means 24 surrounding the rod 19 to prevent leakage. The end walls 11 are provided with the aligned openings 21 forming flow passages, and the hubs or pipe sections 22 are secured to the end walls about the openings 21 as by suitable weld connections.

Sealing assemblies 23 of the type disclosed in copending application Ser. No. 585,228 filed June 9, 1975 now U.S. Pat. 3,972,507 serve to establish seals between the sides of the gate and the valve body for closed position. The preferred construction of the sealing means is shown in FIG. 3. Each of the duplicate assemblies consists of a metal seat ring 26 which is accommodated within an annular recess machined in the corresponding end wall 11 of the body. The recess provides the cylindrical surface 27 and a bottom shoulder surface 28. The seat ring is machined to provide the cylindrical surface 29 which slidably interfits the cylindrical surface 27 of the body. Also the seat ring has an end surface 31 which normally is disposed adjacent and in opposition to the shoulder surface 28.

The seat ring is yieldably urged toward the gate by spring means, preferably in the form of a plurality of coil springs 32 which are circumferentially spaced and disposed about the outer periphery of the seat ring. The ring is provided with an annular recess 33 to accommodate the springs 32, and which provides a retaining shoulder 34 and the thrust shoulder 35. A metal band 36 is shown generally surrounding the recess 33 and springs 32. This band may be attached to the seat rings by suitable means, such as spot welding. The proportioning of the springs 32 and of the recess 33 is such that one end of each spring 32 seats upon the shoulder 35, while the other end normally seats upon the shoulder 37 formed on the end wall 11. When a seat ring is removed from its corresponding body recess, the springs expand in length whereby they engage the shoulder 34 without being completely relaxed, thus providing sufficient frictional retention to prevent them from being dislodged from the recess 33 and the seat ring. During assembly of the springs with the seat ring, the springs are partially compressed and inserted within the recess 33 with their ends engaging the shoulders 34 and 35, thus retaining the springs as a part of the seat ring assembly. This type of spring retention is disclosed and claimed in U.S. Pat. No. 3,339,886 dated Sept. 5, 1967.

That end of each seat ring 26 which engages the gate 18 is provided with sealing means 41 made of resilient material. The particular sealing means illustrated is that disclosed in U.S. Pat. No. 3,746,303 dated July 17, 1973. Briefly, there is an annular recess 42 in the seat ring within which is disposed an annular member 43 made of relatively hard resilient material such as nylon together with a member 44 which is relatively thin in radial dimensioning, and which is made of relatively resilient material, such as a suitable synthetic rubber or elastomer. A suitable fluid pressure seal is established between the cylindrical surfaces 27 and 29, such as a seal of the O-ring type provided by a resilient O-ring 46 which is accommodated within the annular recess 47 in the seat ring.

The assembly described above is shown provided with a sediment guard 48 which is loosely accommodated within the recess 49. In the form illustrated, the sediment guard is a hollow tube made of resilient material, such as a suitable synthetic rubber. A Buna type synthetic rubber having a durometer hardness on the A scale ranging from 60 to 85 has been found satisfactory. In the manufacture, a suitable length of this tubing is made into the for of a hoop and the ends joined by suitable cement. As illustrated, the recess 49 within which the tube is accommodated is undercut at 51 to prevent accidental dislodgment of the tube during assembly or removal of the seat ring from the body. In some instances it may be desirable to reinforce the tube 48 by inner spring means. Thus as illustrated in FIG. 6 a spring 52 formed by a helicoidally wound spring metal ribbon is disposed within the tube 48 and arranged to extend throughout the length of the tube. Whether or not the spring means 52 is employed, the tube 48 has sufficient resilience whereby it retains contact with the seat ring and the shoulder surface 28 for all operating positions which the seat ring may assume during operation of the valve.

The upper portion of the tube 48, illustrated in the upper part of FIG. 3, is provided with a plurality of vent holes 53. These holes permit pressure equalization between the interior and exterior of the tube, and in addition they prevent the tube from forming a fluid pressure seal between the seat ring and the shoulder 28. Thus the space 54 between the shoulder surface 28 and the adjacent end face 31 of the seat ring, and between the O-ring 46 and the guard 48, is vented to the corresponding flow passage 21 of the valve body, thus likewise providing pressure equalization. The openings 53 are in only the upper portion of the sediment guard, as for example, the upper sector of the guard extending over, say, 30°, thus minimizing entrance of sediment into the interior of the guard, or into the space 54.

In the normal operation of such a valve, the seat rings have a limited latitude of movement within the accommodating recesses, although the seat rings are at all times urged by the springs against the sides of the gate. For example, in the construction of a short gate type of valve having a flow passage of the order of 20 inches in diameter, the total permissible movement of each seat ring may be of the order of one-eighth inch. When the gate is closed and no differential pressure applied to the gate, the seat rings may be spaced equal distances from their corresponding shoulder surfaces 28, as for example, one-sixteenth inch. However, when fluid pressure is applied to the left hand side as shown in FIG. 3, the downstream ring 26 is moved to a position in which it is in abutting engagement with the shoulder surface 28, whereby the upstream seat ring is spaced a maximum distance, as for example one-eighth inch, from its corresponding shoulder surface 28. It will be evident that the tubes 48 must be of sufficient size to adequately accommodate for such movements, without failing to function as a sediment guard. In practice, where the movement of the seat rings is of the order of one-eighth inch, the tubes 48 when relaxed before assembly in the valves, may have an external diameter of the order of one-half inches. Such tubes can accommodate seat ring movements of the order of one-eighth inch.

FIGS. 4 and 5 illustrate the two extreme positions of a seat ring. In FIG. 4 the spacing between the shoulder 28 and surface 31 of the seat ring is at a maximum, and the guard 48 is partly compressed and in contact with both the shoulder 28 and the seat ring. In FIG. 5 the surfaces 28 and 31 are in direct abutting engagement and the guard 48 is compressed to a greater degree.

Operation of the sediment guard will be apparent from the above. The resilient tubes 48 provide effective seals to prevent the entrance of foreign material into the spaces 54 between the seat rings and the body, while at the same time avoiding forming seals which might otherwise tend to prevent pressure equalization. The tube 48 is relatively simple in construction and inexpensive to manufacture. It can be readily assembled with the seat rings before the rings are installed within the valve body. With the type of construction described above the seat rings provide a seal between the body and the gate on the upstream side of the valve, and because the sealing means 43 and 46 are on different diameters, a fluid pressure area is provided for urging the upstream seat ring against the gate. Since the tube 48 does not provide a seal under any conditions, it does not at any time interfere with application of fluid pressure to urge the seat rings against the gate on the upstream side. Since the venting for pressure equalization is in the upper portions of the tubes 48, little if any sediment is permitted to enter the interior of the tubes or into the spaces 52 since sediment is prevalent mainly in the lower portions of the valves.

The spreader means utilized in the valve is illustrated particularly in FIGS. 1 and 3. A mounting plate 56 is dimensioned to interfit the bottom of the valve body and can be secured in place by suitable means, such as tack welding. Upright standards 57 are secured to the end portions of the plate 56 as by welding, and serve to support the spreader members 58. Each spreader member 58 is circular in configuration, with its upper edge bevelled as indicated at 59, and with its lower or outer end provided with a flange 64. The diameter of each spreader member 58 is slightly less than the thickness of the gate. Each spreader member is carried loosely by the free end of a leaf spring 61, the spring in turn being secured to the associated standard 57. The leaf springs 61 are substantially relaxed when the spreaders are interposed between the faces of the seat rings 26 and the gate is open. Under such conditions flanges 64 may limit movement of the spreaders in a direction toward the seat rings. The lower end of the gate is arcuate in configuration and dimensioned whereby when the gate is in fully closed position, its lower arcuate edge contacts the adjacent faces of the spreaders 58 but does not completely dislodge the spreaders from their positions between the seat rings. When the gate is in its raised or full open position, its lower margin remains interposed between the upper portions of the seat rings. Therefore, under such conditions the seat rings are supported at three locations, one being the upper portions of the seat rings, and the other two being the support afforded by the spreaders 58. Because of this engagement with the rings on three areas oof contact, the rings do not tend to become cocked within their accommodating recesses.

When it is desired to remove a seat ring from the valve, the gate is first removed, and thereafter a suitable tool is inserted between the seat rings and each of the spreader members 58 is depressed against the urge of the leaf springs 61, until they no longer engage the seat rings or provide a minimum spacing. At this time the seat rings are permitted to move toward each other a sufficient distance whereby the spreader members 58 remain depressed. A similar operation is carried out when it is desired to install seat rings in the valve body. For this operation, a suitable tocl is inserted which depresses the spacer members 58, and while depressed the seat rings are successively applied to the body. The upper portions of the seat rings are then spread to accommodate introduction of the gate. As the gate moves downwardly to its fully closed position, the seat rings are spread sufficiently to permit the spreader members 58 to snap into their normal positions shown in FIG. 1.

The spreader means described above likewise tends to prevent any undue accumulation of sediment behind the seat rings, because the lower portions of the seat rings are not permitted to move toward each other a distance less than the thickness of the gate when the gate is moved to open position. Thus any accumulation of sediment which does manage to occur behind the seat rings cannot prevent proper movement of the gate between open and closed positions.

The sediment guard shown in FIG. 7 consists of an annular member 66 which is accommodated within the annular recess 67 formed in the seat ring 68. Member 66 is formed of a resilient cellular, porous material, such as an open cell foam of suitable synthetic rubber, plastic or elastomer, having the requisite compressibility and recovery characteristics. The upper portion of member 66 is provided with ducts or openings 69 which serve the same function as the holes 53 of FIGS. 4, 5 and 6. The member 66 prevents entrance of sediments into space 71 under all operating conditions.

What is claimed is:

1. In a gate valve construction, a box-like valve body having end walls with aligned openings forming fluid flow passages and also having a flat plate forming a closure for the lower end of the body, a valve gate disposed within the body and movable between upper full open and lower closed positions relative to the flow passages, annular sealing assemblies surrounding the flow passages and serving to establish seals between the body and the side surfaces of the gate, each of said sealing assemblies including a metal seat ring and spring means for urging the seat ring toward the gate, the gate being dimensioned whereby when in full open position it engages only a minor upper portion of each of the seat rings, means at the upper part of the body for operating the gate, and spreader means interposed between the lower portions of the seat rings for both open and closed positions of the gate, said spreader means serving to maintain a desired predetermined spacing between the lower portions of the seat rings when the gate is moved to its open position, said spreader means comprising two spreader members located in the lower side corners of the body and normally disposed between lower portions of the seat rings to directly engage the opposed faces of said seat rings, a mounting plate disposed in the bottom of the valve body adjacent the inner side of the lower closure plate and secured to the body, and leaf springs forming yieldable means serving to secure the spreader members to the end portions of said mounting plate, said yieldable means serving to permit each spreader member to be moved downwardly against the urge of the same to an out-of-the-way position.

* * * * *